United States Patent [19]
Dehennau et al.

[11] Patent Number: 5,567,505
[45] Date of Patent: Oct. 22, 1996

[54] MEANS AND METHOD OF APPLYING A PLASTIC FINISHING LAYER TO THE SURFACE OF A COMPOSITE ARTICLE; COATED COMPOSITE ARTICLE

[75] Inventors: Claude Dehennau, Waterloo; Serge Dupont, Vilvoorde, both of Belgium

[73] Assignee: Solvay (Société Anonyme), Brussels, Belgium

[21] Appl. No.: 515,065

[22] Filed: Aug. 14, 1995

[30] Foreign Application Priority Data

Aug. 16, 1994 [BE] Belgium ............................ 09400741
Dec. 27, 1994 [BE] Belgium ............................ 09401176

[51] Int. Cl.⁶ ............................................ B32B 9/00
[52] U.S. Cl. ........................ 428/188; 428/34.6; 428/91; 428/122; 428/215; 428/267; 428/288; 428/290; 428/358; 428/364; 428/379; 428/902; 264/173.11; 264/174.1; 156/187; 156/244.11; 117/17; 117/18; 117/21
[58] Field of Search ................................ 428/122, 188, 428/317.5, 358, 91, 300, 913, 34.6, 35.8, 36.1, 215, 364, 373, 902, 288, 290, 224, 395, 267; 264/173, 174; 156/187, 244; 117/17, 18, 21

[56] References Cited

U.S. PATENT DOCUMENTS 2,888,954  6/1959  Gates et al. .
3,868,265  2/1975  Sakai et al. .............................. 117/18
4,113,820  9/1978  Tamborini et al. ...................... 264/173

FOREIGN PATENT DOCUMENTS 0294008  12/1988  European Pat. Off. .
1201451  12/1959  France .
2102105   4/1972  France .
2244294   3/1974  Germany .
2077880  12/1981  United Kingdom .
2280870   2/1995  United Kingdom .

Primary Examiner—Patrick Ryan
Assistant Examiner—Abraham Bahta
Attorney, Agent, or Firm—Spencer & Frank

[57] ABSTRACT

Means for applying a plastic finishing layer to the surface of a composite article comprising an extruded plastic-based solid body reinforced by one or more bundles of reinforcing fibers, these bundles being affixed to its surface, comprising a ring (1), the entry diameter (2) of which is greater than its exit diameter (3), the internal surface (4) of the said ring furthermore providing a decreasing variation in the internal diameter between its entry and its exit; method of applying a finishing layer, in which method these means are used, and coated composite article.

10 Claims, 2 Drawing Sheets

MEANS AND METHOD OF APPLYING A PLASTIC FINISHING LAYER TO THE SURFACE OF A COMPOSITE ARTICLE; COATED COMPOSITE ARTICLE

FIELD OF THE INVENTION

The present invention relates to means and to a method for applying a plastic finishing layer to the surface of a composite article, as well as to a coated composite article.

TECHNOLOGY REVIEW

In many industrial fields, composite articles are used consisting of a solid plastic-based body reinforced by means of reinforcing fibres such as glass fibres. These reinforcing fibres may especially be employed in the form of bundles of continuous fibres, these bundles being impregnated with a thermoplastic. It is thus possible to manufacture, for example, bars, rods, longerons, sections, etc., reinforced by bundles of continuous fibres, these bundles being applied or wound at their surface and these articles having a low weight and a high mechanical strength. However, these composite articles have the drawback of being very sensitive to external mechanical and chemical attack, as well as that of having an irregular surface.

For these various reasons, the articles are often coated on the outside with a thermoplastic finishing layer.

It is important for the finishing layer to adhere correctly to the article; if this is not the case, the slightest crack accidentally appearing in it could especially allow external products to come into contact with the article proper over a large part of the article/finishing layer interface, something which could affect the mechanical strength of the article. Furthermore, poor adhesion of the finishing layer could degrade the mechanical properties of the coated article or make them non-uniform.

It is understood that as a result it is necessary, for various reasons, that the adhesion of the finishing layer to the article proper be high.

In order to coat composite articles consisting of a plastic-based solid body reinforced by one or more bundles of reinforcing fibres, these bundles being affixed to its surface, overextrusion (also termed extrusion-coating) is generally used, this consisting in simply depositing the finishing layer on the surface of the article. This is conventionally done by using an overextrusion crosshead into which the plastic constituting the finishing layer is injected laterally in the molten state, the article entering therein on one side and re-emerging, coated with its finishing layer, on the other side. A major drawback of this overextrusion technique is that the plastic constituting the finishing layer cannot be injected under pressure into the over-extrusion device. The reason for this is that, if it were injected under pressure, this molten plastic would not fail to escape from this overextrusion device via the side at which the composite article enters, something which would be particularly irksome. However, because of this simple unpressurized "deposition" of the finishing layer on the surface of the article, its adhesion is generally poor, which runs the risk of resulting especially in the drawbacks explained hereinabove.

The adhesion is even poorer if non-compatible plastics are used in composite materials.

Another problem associated with the finishing layer is that it is generally advisable for the external surface of the coated article to be very precisely sized so as, especially, to allow it to be inserted precisely into orifices or coupling elements such as sleeves, etc. The known sizing devices are very complicated independent devices.

SUMMARY OF THE INVENTION

The subject of the invention is therefore a simple solution allowing a finishing layer to be applied to the surface of a composite article in a manner guaranteeing both good adhesion of the layer and sizing of the coated article thus obtained.

For this purpose, the present invention relates to a ring for applying a finishing layer of a plastic C to the surface of a composite article comprising an extruded plastic-based solid body reinforced by one or more bundles of reinforcing fibres, these bundles being affixed to its surface, the entry diameter of the ring being greater than its exit diameter, the internal surface of the ring furthermore providing a decreasing variation in the internal diameter between its entry and its exit.

The extruded solid body may be of any type. It may, especially, be a cylindrical or prismatic bar or else a section. This section may be of any known type. By extension, this is also understood to mean here a hollow non-cylindrical section.

The solid body advantageously has a convex cross-section. However, the invention also relates to solid bodies of non-convex cross-section, the reinforcing fibres then being affixed to their surface parallel to their longitudinal axis.

The plastic C may essentially consist of one or more polymers of any kind. Advantageously, it is thermoplastic, that is to say the polymer or polymers essentially constituting it are thermoplastic polymers. If several different polymers are used in a blend, they must be mutually compatible, especially so that the finishing layer exhibits satisfactory mechanical properties. By way of example of thermoplastic polymers, particular mention may be made of polyolefins, including polyethylene (PE) for example, vinyl chloride polymers, including poly(vinyl chloride) (PVC) for example, as well as polymers derived from vinylidenefluoride, including poly(vinylidenefluoride) (PVDF) for example. Good results have been obtained from polyolefins, in particular from PE. As PE, medium-density polyethylene (MDPE) or high-density polyethylene (HDPE) is preferably used. It is most particularly preferred that the plastic C be essentially made of high-density polyethylene (HDPE).

The thickness of the finishing layer is conventionally determined depending on the type of article coated and on the applications for which it is intended. Often the thickness of the finishing layer is small, preferably of an order of magnitude substantially smaller than the mean transverse dimensions of the article. In particular, the thickness of the finishing layer is often of the order of 1 to 2 mm. The finishing layer has several functions: first of all, it physically protects the article and its reinforcing materials from any mechanical degradation, especially during handling, transportation and installation. This is particularly important in the case of articles reinforced by one or more bundles of continuous reinforcing fibres, these bundles being wound helically at their surface. Next, the finishing layer may include pigments making it easier to identify the article, and/or other additives such as UV stabilizers. The finishing layer may also provide chemical protection of the article and of its possible reinforcing materials, especially with respect to corrosive products and products capable of causing deterioration of the adhesion of the reinforcing materials to the body of the article. It may also, if it adheres well to the article proper, contribute to taking up the loads and thus improve its strength.

The article may comprise one or more layers. In particular, it may be a multilayer article in which at least the external layer is essentially made of plastic. It is preferred to use articles based on a plastic A similarly complying with the definition of the plastic C given hereinabove.

Any known additive may be added to the plastics A and/or C, for example one or more pigments, processing aids, antioxidants, stabilizers, mineral fillers, etc., as long as their presence does not appreciably affect the mechanical properties nor the mutual compatibility of these plastics.

Ring is understood to mean a solid having an orifice whose cross-section perpendicular to the axis of the article has the shape of the cross-section of the article.

Diameter is understood to mean the hydraulic diameter of the abovementioned cross-section of the orifice of the ring, namely four times the area of the cross-section divided by its perimeter. In the case of an orifice of circular cross-section, this hydraulic diameter corresponds to the diameter of the orifice whereas, in the special case of an orifice of square cross-section, it corresponds to the length of one side of the orifice.

In general, the dimension of the exit orifice of the ring corresponds approximately to the external dimension of the article increased by twice the desired thickness of the finishing layer. It may be very slightly greater than the final dimension of the article coated with the finishing layer so as to take into account the shrinkage of the plastic which will occur as it cools down.

The profile of the internal surface of the ring is preferably such that the angle which its tangent makes with the axis of the pipe is relatively small at its exit. Preferably, this angle is less than 5°. The internal surface of the ring preferably has no discontinuity in the variation in its diameter. This internal surface may be advantageously include, on the exit side of the ring, a region of constant cross-section, in particular a cylindrical region. Good results have been obtained with the internal surface of the ring, or at least its non-constant cross-section part, having a hyperbolic, parabolic or rectilinear profile.

The ring may be made from any suitable material or any combination of suitable materials; it may especially be based on a metal such as steel or bronze.

The internal surface of the ring very advantageously has a low coefficient of friction with respect to the plastic C. For this purpose, the internal surface may comprise a non-stick material. Non-stick material is understood to mean a material not adhering to the plastic passing through the ring. The internal surface is often made of a non-stick material. In particular, it is possible to make the entire ring in such a material. Alternatively, it is possible to coat the inside of a ring made of a suitable material with a thin layer of a non-stick material, for example a fluoropolymer such as polytetrafluoroethylene (PTFE). If necessary, an adhesive may be used to fix this material to the inside of the ring.

This ring is generally used in conjunction with an overextrusion device as described hereinabove, making it possible to deposit a plastic finishing layer on the surface of an article. A second subject of the present invention therefore relates to a device for applying a finishing layer of a plastic C to the surface of a composite article comprising an extruded plastic-based solid body reinforced by one or more bundles of reinforcing fibres, these bundles being affixed to its surface, comprising an overextrusion device which is characterized in that a ring as described hereinabove is associated with the overextrusion device.

The overextrusion device comprises an entry orifice via which the article may be introduced, having a dimension slightly greater than that of the article, and an exit orifice located in the axis of the entry orifice. It also comprises a lateral orifice via which the plastic constituting the finishing layer is injected in the molten state. The overextrusion device is furthermore designed so that the molten plastic spreads out uniformly over the entire periphery of the article. The molten plastic can come into contact with the article inside the overextrusion device, the latter including a single exit orifice via which the article, on which the plastic C is deposited, leaves, or on the outside of this device, the latter then including a central orifice via which the article leaves and a concentric peripheral orifice via which the plastic C leaves. A ring as described hereinabove is associated with this over-extrusion device. This ring is generally arranged in the axis of the exit orifice of the overextrusion device, a short distance from this orifice. Very advantageously, this ring may be attached directly to it. In this way, the plastic C constituting the finishing layer is still at a high temperature when the article on which the finishing layer has been deposited passes through the ring, thereby improving the effectiveness of the application step, that is to say the adhesion of the finishing layer to the article. Preferably, the dimension of the entry orifice of the ring is slightly greater than or equal to that of the exit orifice via which the plastic C leaves the overextrusion device.

The device using a ring in accordance with the invention makes it possible to apply a plastic finishing layer to the surface of an article firmly and durably, while at the same time simultaneously giving the article thus obtained a constant and precise external dimension.

Furthermore, another advantage of the device of the invention is its simplicity. The device of the invention has the advantage of including no moving parts and of exerting a completely uniformly distributed pressure on the finishing layer.

Moreover, this application device is advantageously used in combination with the device for manufacturing the article. The invention therefore also relates to an installation for the manufacture of a composite article comprising an extruded plastic-based solid body reinforced by one or more bundles of reinforcing fibres, these bundles being affixed to its surface, and which body is coated by a finishing layer of a plastic C, comprising a device for manufacturing the article as well as a device for applying a finishing layer as defined hereinabove. In the case of an article comprising a multilayer plastic-based solid body, a coextrusion device is generally used to manufacture the solid body. In order to reinforce the solid body by one or more bundles of reinforcing fibres, these bundles being affixed to its surface, the device for manufacturing the article generally comprises a device for extruding a solid body based on a plastic A and a device for winding one or more bundles of reinforcing fibres around this solid body. According to an advantageous variant, the solid body is reinforced by one or more bundles of reinforcing fibres, these bundles being wound helically at its surface. Preferably, the bundle or bundles of reinforcing fibres, which bundles are arranged helically around the solid body, are wound almost perpendicular to the axis of the latter, for example at more than 80°.

The plastic A complies in a similar manner with the definition of the plastic C given hereinabove, and may also contain one or more additives such as those mentioned hereinabove. If several different polymers are used, as a blend or in separate layers, for the solid body, they must preferably be mutually compatible so that the solid body exhibits satisfactory mechanical properties.

The reinforcing fibres used in the bundle(s) affixed to the surface of the solid body may also be of any type, for example glass, carbon or aramid fibres. It is preferable to use glass fibres. The diameter of the fibres is generally of the order of 7 to 100 μm. These fibres are continuous or at least have a very great length, for example of the order of several hundreds of meters.

Advantageously, the reinforcing fibres are pre-impregnated by a plastic B and the bundle of reinforcing fibres is thus in the form of a COFIT (continuous fibre impregnated by a thermoplastic). Such a bundle may in particular be obtained by directly impregnating the reinforcing fibres with the plastic. It may also be obtained by employing a comingled bundle of continuous reinforcing fibres and of continuous plastic fibres. It may also be obtained by employing a bundle of reinforcing fibres between which the plastic has been dispersed in powder form. In the last two ways of obtaining the bundle, it is, of course, absolutely essential to heat it, before affixing it to the solid body, so that the plastic melts and impregnates the reinforcing fibres uniformly.

The plastic B complies similarly with the definition of the plastic C given hereinabove and may also contain one or more additives such as those mentioned hereinabove. If the plastic B comprises several different polymers used as a blend, they must be mutually compatible so that the COFIT exhibits satisfactory mechanical properties.

In order to ensure good adhesion of the COFIT to the solid body, and therefore good uptake of forces by the COFIT, the plastic B is preferably compatible with the plastic A or of a similar chemical nature. By way of pairs of plastics of similar chemical nature, it is possible, for example, to use either two polymers of olefin type (for example two ethylene polymers) or two polymers of vinyl type (for example two vinyl chloride polymers or two vinylidene fluoride polymers) together. These plastics may be made compatible by the use of one or more suitable compatibilizers.

The bundle of reinforcing fibres may be affixed in any known manner. In particular, the bundle may be wound, more particularly wound helically. It may also be affixed longitudinally.

In order to improve the adhesion between the solid body and the COFIT or COFITs, the latter are affixed preferably after having raised the solid body and/or the COFIT(s) to a surface temperature close to the melting or softening temperature of their constituent plastic A and/or B. Advantageously, affixing is assisted by applying a pressure.

For the same reason, it is desirable that the plastic C also be compatible with the plastic B, or be of similar chemical nature, thereby making it possible to obtain good adhesion between the finishing layer and the "layer" formed by the COFIT(s) at the surface of the solid body. This good adhesion is highly desirable since it avoids any risk of delamination of the finishing layer. It may also be achieved by using one or more suitable compatibilizers.

When the reinforcing fibres are impregnated by a plastic B, respective quantities of plastic B and of reinforcing fibres are generally used such that the COFIT thus formed contains of the order of several hundreds, or indeed several thousands of fibres per $mm^2$ of cross-section. The reinforcing layer generally has a thickness of the order of 0.002 to 0.01 times the diameter of the solid body, depending on the properties of the finishing layer and on the desired mechanical strength of the coated article. It is necessary for the fibres chosen to be chemically with the plastic B; in order to increase this compatibility, and therefore their adhesion to their matrix, they are generally coated with an appropriate coupling (or sizing) agent. In the case of glass fibres, it is possible, for example, to use for this purpose one of the compounds of the family of silanes well known in this context.

The device for applying the finishing layer is preferably installed in the axis of the die of the extrusion device and of the reinforcing device, all three being arranged a short distance from one another so that the extruded and reinforced solid body is still at a high surface temperature during application of the finishing layer. If this is not the case, the extruded and reinforced solid body is advantageously surface heated before applying the finishing layer, yet obviously avoiding raising it to a temperature which could result in it deforming appreciably.

When a winding device is used to affix the bundle(s) of reinforcing fibres to the surface of the solid body, this device generally comprises one or more rotating annular plates, these being coaxial with the extruded solid body and each carrying one or more reels for paying out bundles of reinforcing fibres, the axes of which are substantially parallel to that of the solid body; it makes it possible to wind this(these) bundle(s) approximately helically at the surface of the mandrel. When the reinforcing fibres are impregnated with plastic B, each reel for paying out bundles of reinforcing fibres is advantageously associated with a heating device making it possible to raise the plastic B impregnating the fibres to a temperature close to its melting or softening temperature, before they come into contact with the solid body.

The present invention also relates to a method allowing application of a plastic finishing layer to the surface of a composite article comprising an extruded plastic-based solid body reinforced by one or more bundles of reinforcing fibres, these bundles being affixed to its surface in such a manner that their adhesion is high and such that the coated article has a relatively constant external diameter. More precisely, a further subject of the invention relates to a method of applying a finishing layer of plastic C on a composite article comprising an extruded plastic-based solid body reinforced by one or more bundles of reinforcing fibres, these bundles being affixed to its surface, in which method the article passes through a device for applying a finishing layer as described hereinabove.

In order to prevent any blockage of the ring for applying the finishing layer, or upstream thereof, by the plastic C, it is advantageous for the flowrate of the said plastic entering the ring to correspond to the flowrate exiting the ring in order to constitute the finishing layer.

In particular, the method in accordance with the invention is particularly advantageous when the article comprises a solid body based on a plastic A reinforced by one or more bundles of reinforcing fibres which bundles are wound at its surface. As explained hereinabove, the bundle of reinforcing fibres is preferably a COFIT.

The plastics A, B and C are such as defined hereinabove. In particular, the plastics employed are advantageously thermoplastics. Preferably, the plastics employed are compatible. In a particularly advantageous embodiment, the plastics employed essentially consist of high-density polyethylene.

As has been mentioned already, the invention makes it possible to obtain coated composite articles possessing constant and precise external dimensions despite the interposition of one or more windings of bundles of reinforcing fibres between the solid body and the finishing layer.

The invention therefore also relates to a composite article comprising an extruded plastic-based solid body to the surface of which are affixed, and preferably wound thereat, one or more COFITs and which body is coated on the outside by a finishing layer, which article is characterized in that the mean variation in the roughness of the external surface measured along a generatrix of the said article does not exceed 0.4 mm. Preferably, this variation does not exceed 0.3 mm.

Variation in the roughness of the external surface measured along a generatrix of the article is understood to mean here the difference in level between the peaks and troughs of the external surface of the finishing layer of the coated article, measured along a generatrix of the said coated article. By repeating this measurement along various generatrices, it is possible to calculate the characteristic mean variation.

This mean variation expresses in particular the quality of the sizing. It also reflects the extent to which the irregularities due to the windings of bundles of reinforcing fibres have been able to be "compensated" for by the finishing layer.

The coated article may also possibly comprise layers other than the solid body, the reinforcing fibres and the finishing layer. For example, such an additional layer may be an impermeabilizing layer which may consist of a metal foil wound around the solid body and the reinforcing fibres, on which foil the finishing layer is applied.

DETAILED DESCRIPTION OF THE INVENTION

Figure 1:
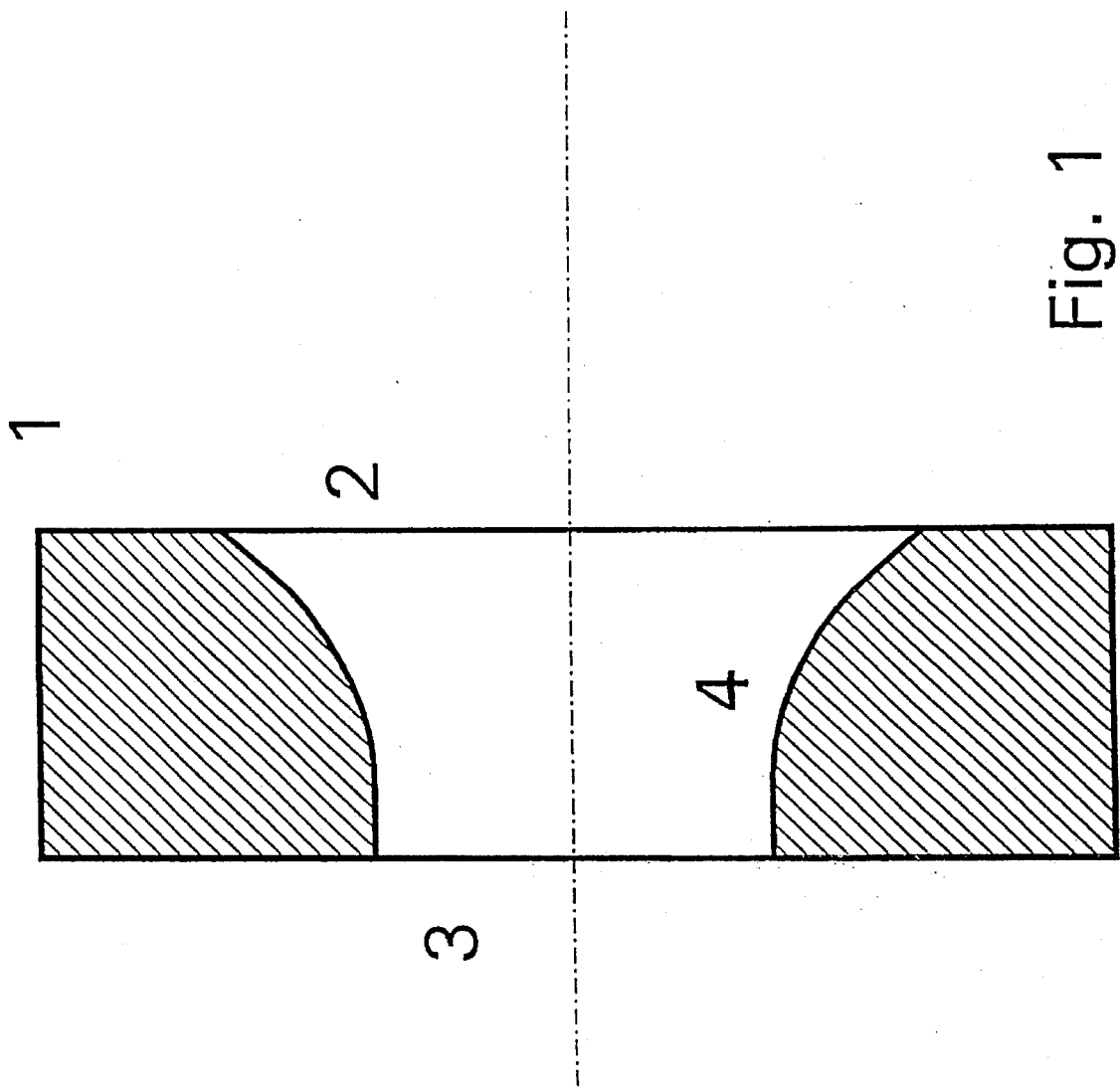
FIGS. 1 and 2 attached hereto illustrate the present invention in a non-limiting manner.

FIG. 1 represents, in section, a ring (1) of circular cross-section in accordance with the invention, having an entry (2) and an exit (3) of smaller diameter. The internal surface (4) of this ring provides a decreasing variation in its internal diameter.

Figure 2:
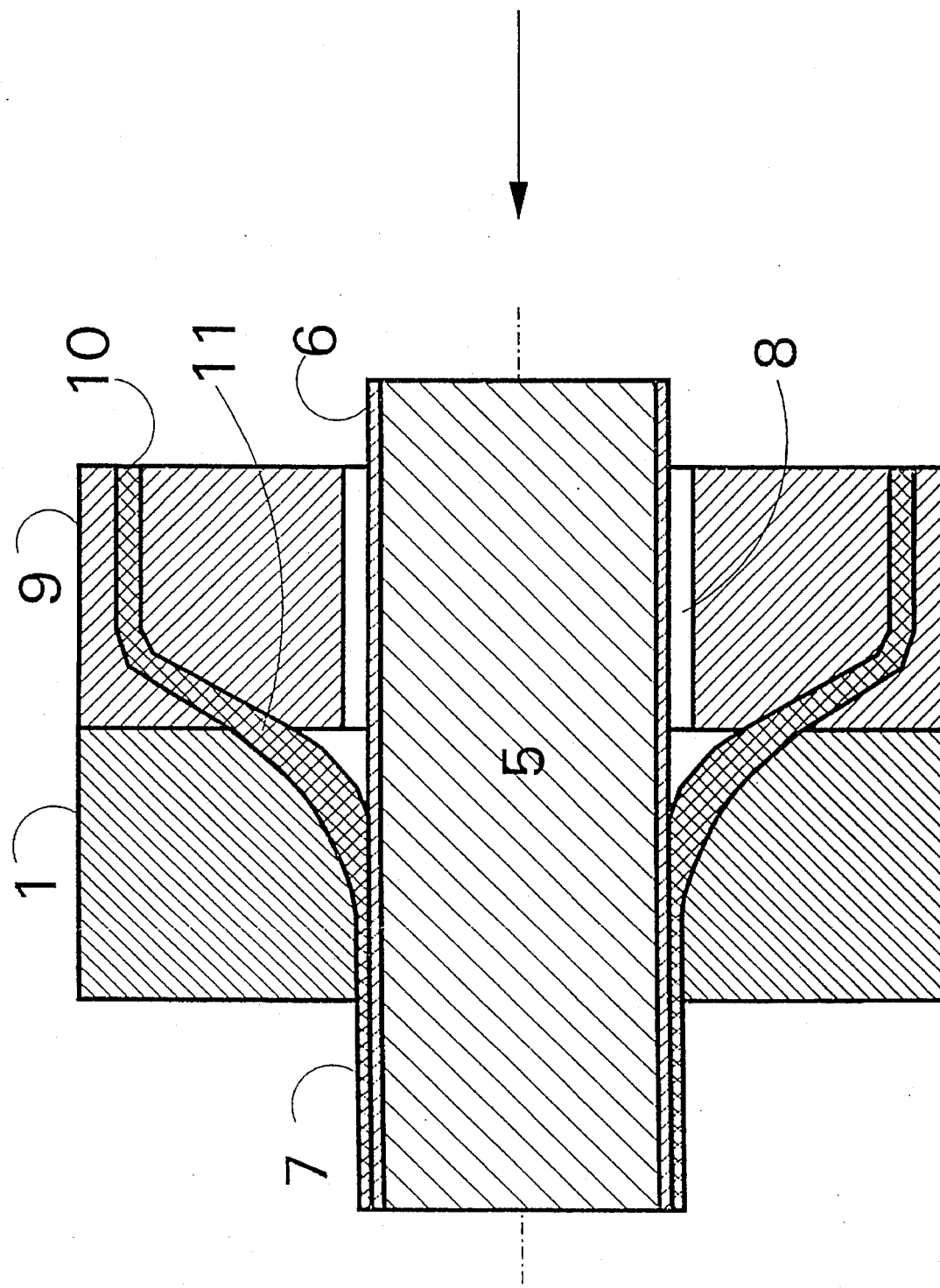

FIG. 2 represents a device for applying a finishing layer (7) to the surface of a composite article of circular cross-section comprising an extruded cylindrical bar (5) based on a plastic A reinforced by a helical winding of bundles of reinforcing fibres (6). This application device comprises an overextrusion device (9) with which is associated a ring (1) in accordance with the invention, arranged in the axis of the overextrusion device. The latter comprises a central orifice (8) through which the reinforced article (5, 6) passes, as well as an annular internal space (10) fed with molten plastic C by an extruder (not shown). This internal space converges and terminates in an annular peripheral orifice (11), through which the molten plastic C flows, the external diameter of which orifice is approximately equal to the diameter of the entry orifice of the ring (1). The latter is contiguous with the overextrusion device.

By way of non-limiting examples, the invention makes it possible especially to produce plastic-based solid bars which have a cylindrical, rectangular or other cross-section, manufactured by extrusion and reinforced by bundles of reinforcing fibres, these bundles being wound at their surface, and which, by virtue of the application of a plastic finishing layer using a ring in accordance with the invention, have precise dimensions and an acceptable surface finish.

Such bars may, for example, serve to increase the flexural and/or torsional rigidity of various assemblies, such as doors or other parts of vehicles; they may especially act as driveshafts.

Likewise, the invention also makes it possible to produce sections of various cross-sections, for example L-, T- or U-sections, which are reinforced by bundles of reinforcing fibres, these bundles being affixed to their surface parallel to their axis, and which themselves, by virtue of the invention, have precise dimensions and an acceptable surface finish.

What is claimed is:

1. An installation for the manufacture and coating of a composite article, the composite article comprising an extruded solid body comprised of a plastic material, and at least one bundle of reinforcing fibers, the bundle being affixed to a surface of the body to reinforce the body, the body being coated by a finishing layer of plastic C, said installation comprising;

means for manufacturing the composite article;

an overextrusion device receiving the composite article from said means, for applying the finishing layer to the surface of the body; and a ring associated with said overextrusion device and exerting a completely uniformly distributed pressure on the finishing layer, said ring having an entry with an entry diameter, an exit with an exit diameter smaller than the entry diameter, and an internal passage connecting the entry with the exit, the internal passage having a diameter that progressively decreases from the entry to the exit.

2. The installation according to claim 1, wherein said means for manufacturing the composite article comprises a device for extruding the solid body using a plastic A, and a device for winding the bundle of reinforcing fibres around the solid body.

3. The installation according to claim 1, wherein a surface of the internal passage has a profile, the profile at the exit of said ring being arranged at an angle of less than 5° relative to an axis of said ring.

4. The installation according to claim 1, wherein a surface of the internal passage essentially consists of a non-stick material.

5. The installation according to claim 1, wherein the internal passage has a constant cross sectional profile in a region of the exit.

6. A method of applying a finishing layer of a plastic C to a composite article, the composite article comprising an extruded solid body comprised of a plastic material, and at least one bundle of reinforcing fibres, the bundle being affixed to a surface of the body to reinforce the body, comprising the steps of:

manufacturing the composite article;

passing the composite article through an overextrusion device for applying the finishing layer to the composite article;

passing the composite article through a ring, the ring having an entry with an entry diameter, an exit with an exit diameter smaller than the entry diameter, and an internal passage connecting the entry with the exit, the internal passage having a diameter that progressively decreases from the entry to the exit; and exerting a completely uniformly distributed pressure on the finishing layer using the ring.

7. The method according to claim 6, wherein said manufacturing step includes the steps of forming the solid body of a plastic A, and winding the bundle of reinforcing fibres around the surface of the body to reinforce the body (6).

8. The method according to claim 7, wherein the bundle of reinforcing fibres is a continuous fiber bundle impregnated by a thermoplastic.

9. The method according to claim 6, wherein the plastic C, and the plastic material, essentially consist of high-density polyethylene.

10. A coated composite article comprising:

an extruded solid body comprised of a plastic material;

at least one continuous fiber bundle impregnated by a thermoplastic, said bundle being wound about a surface of said solid body; and a finishing layer coating an outer surface of said composite article, said finishing layer forming an external surface, wherein a mean variation in a roughness of the external surface measured along a generatrix of the coated composite article does not exceed 0.4 mm.

* * * * *